Patented Aug. 28, 1928.

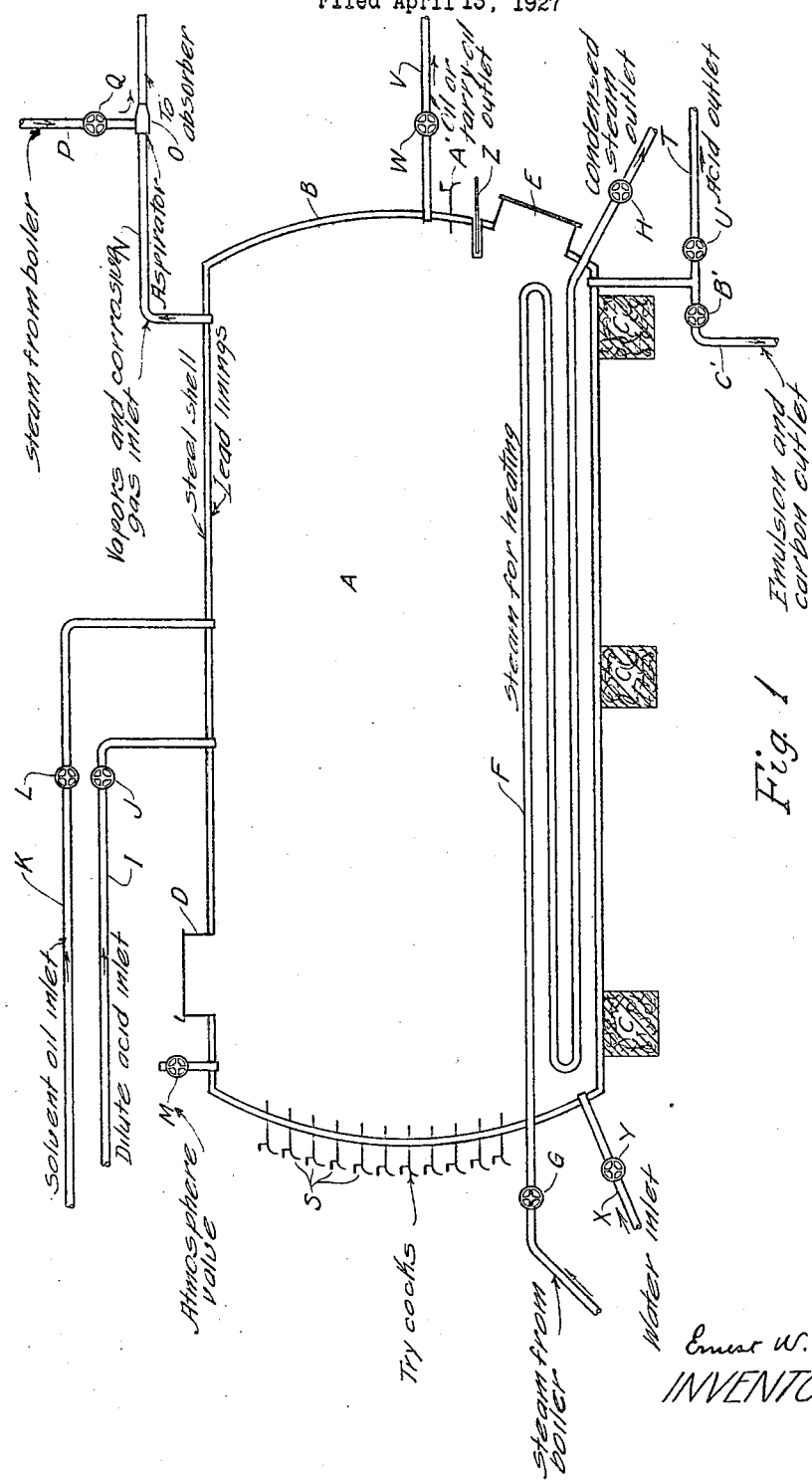

1,682,713

UNITED STATES PATENT OFFICE.

ERNEST W. ROTH, OF LOS ANGELES, CALIFORNIA.

NORMAL-PRESSURE ACID-SLUDGE HYDROLYSIS.

Application filed April 13, 1927. Serial No. 183,594.

My invention is directed to the hydrolysis of acid sludge and its separation into its constituents at atmospheric pressure and without the formation of any intermediate emulsion.

In my copending application, Serial No. 183,595, filed April 13, 1927, it is set forth that the sludges produced by the treatment of petroleum products with sulfuric acid may be hydrolyzed and the constituents thereof chemically separated by treating them with dilute sulfuric acid, either with or without the presence of a solvent oil, on heating the mixture and agitating the mixture by means of steam jets. It is stated in the said disclosure that the hydrolysis of the acid sludge to free acid and oil is often accompanied by the formation of an emulsion consisting of dilute acid, separated oil or tar and such solvent oil as may be added, and it is further therein stated that this emulsion may be broken by various methods, of which one method, to wit:—the heating of the emulsion under pressure to a temperature higher than the normal-pressure boiling point of the acid solution, is therein described and claimed.

It is old in the art of separating acid sludges to treat them with water both at atmospheric pressure and at higher pressures, heat being communicated to the material under treatment an intermixture of the water with the sludge being accomplished by the introduction into the mass of jets of live or direct steam. This treatment, where the conditions are properly regulated, produces a chemical separation of the sludge into its constituents, that is to say, into a more or less dilute solution of sulfuric acid and an oil or tar which, prior to the treatment, was chemically combined with the acid. This chemical separation is seldom accompanied by a physical separation of the hydrolyzed products from each other, on the contrary the treatment with jets of steam almost always produces a very close emulsification of the two constituents with each other. This emulsion may be broken by the means set forth in the said copending application Serial No. 183,595, or it may be broken by the means set forth in my copending application, Serial No. 183,593, filed April 13, 1927, or it may be to some extent prevented by carrying out the treatment with steam under very high pressures, up to 100 pounds or more per square inch. All of these means and methods, however, have their attending disadvantages when operating with certain classes of materials, and it is desirable that a method be provided by which the chemical and the physical separation of the constituents of the acid sludge may be effected concurrently, without the use of pressures above atmospheric and without the formation of an emulsion as an intermediate product.

The object of my invention is to provide such a process, and a further object is to provide a method of separating and of regaining the value of acid sludges which may be carried out in a cheap and simple apparatus, with a minimum of cost for plant and for operation.

To these ends I proceed, in brief, in the following manner. The acid sludge is digested with a relatively large quantity of a relatively dilute solution of sulfuric acid, preferably with the addition, prior to or during the course of the digestion, of an oil having the capacity of dissolving and diluting the tarry product formed by hydrolysis during the digestion. The acid solution used is of such strength that the sludge will float on the surface of the acid layer. The digestion is accomplished by heating the acid layer in such manner that it will not be caused to froth up into nor intermix with the layer of sludge lying thereon but preferably will be caused to gently simmer in such manner as to set up convection current in both the acid layer and the sludge layer without intermixing them. Under these conditions hydrolysis takes place at the plane of contact between the acid layer and the sludge layer whereupon the hydrolyzed oil, being substantially lighter than the sludge, will rise to the upper surface of the sludge layer (where it will intermix with and dissolve in the solvent oil, if such be used) and expose a fresh surface of sludge to contact with the acid. At the same time the sulfuric acid liberated by the hydrolysis, being heavier than the acid solution used, will likewise pass away from the contact surface and dissolve in and intermix with the acid layer, thus exposing a fresh surface of the acid solution to contact with the sludge. The requisite strength of acid is maintained in the acid layer by the addition, from time to time, of such small quantities of water as are required for this purpose. By this operation the sludge may be completely hydrolyzed and separated, not only chemically but also physically, and at the end of the digestion the sludge will be found to be completely hydrolyzed and converted into sulfuric acid and an oil soluble tar (or a solution thereof if a solvent oil be used) and will further be found to be in two sharply separated layers, the acid below and the tarry product above. There will usually be a slight intermediate layer consisting of carbon originally present in the sludge and sometimes a trace of emulsion which need not be removed from the apparatus. The two layers of acid and of tar are drawn from the apparatus direct to storage without any further treatment.

Further objects of my invention and a preferred means for putting it into operation may be seen in the following description and the accompanying drawing in which Figure 1 is a longitudinal section illustrating in a strictly diagrammatic manner a preferred apparatus.

Referring to Figure 1, A is a digester, preferably a steel tank of strength sufficient to safely support the weight of the charge, but which need not be constructed to withstand internal pressure. This shell must be acid proof and is preferably lined with sheet lead as indicated at B. This shell may rest on concrete blocks as indicated at C, or it may be supported in any other suitable and well known manner. D is a manhole through which the charge of sludge may be introduced and which need not be provided with a tightly fitting cover, a simple lead covered plate being sufficient for the purpose. E is a similar manhole used only for the purpose of cleaning out the apparatus on occasion and for gaining access to its interior, and which should preferably have a bolt-on cover. F is a steam coil of acid proof material capable of withstanding at least 100 pounds steam pressure and of such size as to heat the charge of acid with some reasonable degree of rapidity. Steam is admitted to this coil through the valve G from a steam boiler (not shown) and the water condensed in the coil F may be released through the valve H to a drain or other suitable point of disposal for condensed water. The valve H may desirably be replaced by a steam trap of any of the well known types. The line I controlled by the valve J connects the digester with any suitable source of supply of dilute acid, and the line K controlled by the valve L connects the digester with any suitable source of supply of solvent oil in case the use of such oil in the operation be preferred. The valve M connects the inside of the digester with the atmosphere and is used as a means to admit air to the apparatus in case the pressure on the digester should at any time fall below atmospheric pressure. This valve may desirably be replaced by any of the well known types of vacuum release valve which must, if used, be of acid proof metal.

The line N vents the digester to the open air or it may if preferred be carried into a condenser (not shown) for the purpose of condensing any vapors of water or oil escaping from the digester. The principal purpose of the line N is to rid the digester of sulfur dioxid and other corrosive and objectionable gases arising from the sludge during the digestion process and it is preferable to place in this line, on either side of the condenser, some sort of aspirating device such for instance as the steam aspirator indicated at O, supplied with steam through the line P controlled by the valve Q, and to discharge this aspirator into a stack, absorber or other well known means for preventing the nuisance incident to the escape of such gases into the atmosphere. The try cocks S—S are used for determining the nature and the relative quantity of materials in the digester during the cooking operation, and should be rather closely spaced, preferably six inches or less. The line T controlled by the valve U is used for withdrawing all or the desired quantity of the acid solution from the digester at the end of the operation, and the line V controlled by the valve W is similarly used for withdrawing the oily or tarry product. Each of these lines leads to a suitable point of storage for disposal of these materials. The line X controlled by the valve Y is used for admitting water to the acid contents of the digester, and is connected from any suitable source of supply of water.

The manner in which this apparatus is operated and the requirements as to quantity and quality of the various materials entering into the operation are as follows.

A sufficient quantity of dilute acid is charged to the digester. This acid is preferably a recovered acid from a previous operation, and is preferably left behind in withdrawing the products of a previous treatment. The gravity of the acid solution should preferably be about 30° Bé. (at normal temperatures) though a somewhat weaker or stronger acid may be used. The acid must be heavy enough to float the sludge and keep it out of contact with the bottom of the digester, which requires that it be say 20° Bé. or heavier, and on the other hand it must not be heavier than about 50° Bé. or the hydrolysis will not take place at atmospheric pressure. 30° Bé. is a preferred figure, and as the product from the operation is usually somewhat stronger the portion taken for a fresh charge may be brought back to this gravity by the addition of water.

The exact quantity of acid is immaterial so long as the digester contains a sufficiently deep layer to prevent the sludge from resting on the bottom of the digester when cold, as if the sludge has opportunity to lay hold of the metal, melting of the sludge will be much retarded and the entire course of the operation otherwise impaired, as will hereafter appear. As nothing is to be gained by economizing acid charge, a quantity equal to say one-third the volume of the total charge is preferable.

I next place in the digester a sufficient quantity of solvent oil. This oil is preferably the distillate from crude petroleum known as gas oil, having a gravity about 28/30° Bé. A similar distillate from cracked petroleum is even better, the solvent power being higher. A lighter product such as kerosene works as well, but is too expensive for commercial use, while heavier oils such as non-viscous neutrals require increased doses to secure the same rate of separation. The function of the solvent oil is to accelerate separation of the sludge by reducing the viscosity of the oil-soluble constituents thereof, and therefore the more mobile the solvent oil the smaller will be the quantity required.

The quantity of solvent oil will vary with the nature of the sludge, very thick or solid sludges, containing high proportions of asphalt, requiring more solvent than such as consist mainly of sulfonic acids. A dose of say ten per cent of the volume of the sludge is suggested as an approximation, and the dose may be increased or decreased after observing the fluidity and rate of separation of the oily product of the operation. It should be here stated that while the use of a solvent oil greatly facilitates the operation, its use is not necessary or essential, as good results may be obtained without it.

The acid should preferably be placed in the digester first, and the sludge must be added after the acid. It is immaterial at what point the solvent oil is added. The sludge may be fed in through the manhole F in any convenient manner, preferably direct from the agitators in which the oil is treated if the sludge is of such nature as to solidify on cooling. The quantity of sludge should be such that, when melted, the total charge will fill the digester to not more than three-fourths its capacity. Some room has to be allowed for frothing, though when solvent oil is used as herein specified the frothing which otherwise takes place is much reduced.

The total charge being in place in the digester the cover of the manhole D is replaced and a full head of steam turned into the coil F by opening the valve G, the valve H being left far enough open to free the coil of condensed water. If the acid layer in the digester is left behind from a previous operation and is therefore already hot, the heating up should be done with considerable care and in any case the temperature of the acid layer should be carefully watched, by observing the thermometer Z, to prevent passing the boiling point of the acid which would result in a sudden froth-up and endanger the formation of an emulsion. When the boiling point is closely approached the steam valve G should be choked down and the supply of steam to the coil F thereafter so regulated as to produce only a gentle simmering of the acid layer and to avoid frothing or splashing of the acid into the layer of sludge lying thereon.

These conditions should be maintained without change until the hydrolysis of the sludge is completed. This point may be determined in two ways. It will almost always coincide with an entire cessation of evolution of sulfur dioxid from the charge, as may be observed by noting the odor of the gas escaping from the end of the pipe N. It may also be determined by withdrawing samples of the tarry layer through one of the upper try cocks S. If a few drops of this layer, when squeezed to a thin film, between two glass plates, shows a uniform brownish coloration without showing any black specks of undissolved sludge, the operation is complete, but if there is any appreciable quantity of such sludge specks cooking should be continued. It should here be noted that in almost all cases the tarry layer, even after complete hydrolysis, will contain some suspended carbon which will be in very fine specks and might be mistaken for sludge. The difference may be readily determined by pressing the two plates vigorously together, allowing them to cool, separating them and rinsing off the tar with gasoline or kerosene. This washing will remove from the glass the hydrolyzed tar and any carbon contained therein, but the sludge specks, if any, will stick to the glass and resist the action of the solvent.

The digestion of the charge having thus been completed the steam should be completely shut off from the coil F and the contents of the digester allowed to stand undisturbed for at least ten minutes, and preferably for about an hour, to permit the separation of small quantities of material belonging properly in one layer which may be entrained in the other. The drain valve U should be then gently opened, allowing a portion of the acid layer to escape through the pipe T into any suitable receptacle in which it may be stored and from which it may be drawn for concentration or other treatment. The drawing of this acid layer should be continued until oil or emulsion shows in the test cock A′, and at this point the valve U should be closed and the drawing of acid discontinued. The valve W is then opened and the layer of tar produced by the hydrolysis allowed to escape through the line V to any suitable receptacle, from which it may be withdrawn for use as fuel or for the manufacture of asphalt or for any other desired purpose. The layer situated between the level of the test cock A' and the level of the oil outlet line V should in all cases be left behind in the digester until such time as a sufficient quantity of free carbon accumulates in this layer to interfere with the proper functioning of the operation. At such time the quantity of acid solution remaining in the digester should be withdrawn therefrom through line T by opening the valve U, which valve should be closed as soon as oil appears at the outlet of the line T. The valve B' on the line C' is then opened and the emulsion and carbon which has cooled in the digester should be drawn out to a drain or other point of disposal as a waste product. It should not be saved and put back with a fresh charge as this would cause the free carbon to accumulate indefinitely.

In the normal operation of this apparatus it is preferable to leave behind on the completion of each operation a sufficient quantity of acid to start the next operation, as above described. As the acid in the digester will increase in strength during the progress of the operation it should, after drawing off the oily layer, be diluted back to its initial concentration, which may be accomplished by admitting water through the line X by opening the valve Y and at the same time turning enough steam into the coil F to set up convection currents which will intermix the water with the acid. This intermixture may, if preferred, be accomplished by introducing steam into the acid layer through a perforated pipe (not shown) but the use of live steam for this purpose is dangerous and not to be recommended, inasmuch as unless considerable care is exercised it may produce emulsification of the acid with any oil remaining in the digester. It should be further stated that during the progress of the operation the strength of the acid solution should not in any case be allowed to become greater than about 65% $H_2SO_4$, corresponding to a gravity of about 52° Bé., and the strength should preferably not be allowed to advance beyond 60% $H_2SO_4$, corresponding to a gravity of about 50° Bé. Samples of the acid layer should be withdrawn at intervals during the progress of the digestion, cooled and the gravity taken, and the requisite quantity of water added.

For the sake of conserving heat and for the further purpose of preventing convection currents during the settling period following the completion of the digestion itself, it is very desirable, though not essential, that the apparatus should be well lagged with heat insulating material. On account of the low temperature carried, which does not much exceed 260° F., an inexpensive insulating material suitable to low temperature may be used for this purpose.

I claim as my invention:

1. The method of separating acid sludge into useful constituents which comprises; heating a supernatant layer of acid sludge by means of heat applied to an underlying layer of dilute acid having a density greater than that of said sludge, said acid being maintained at its simmering temperature during said heating and without material agitation of said sludge layer.

2. A process substantially as and for the purpose set forth in claim 1, in which the acid layer is maintained below its temperature of ebullition during said heating.

3. A process substantially as and for the purpose set forth in claim 1, in which a solvent oil is admixed with the sludge and heated therewith.

4. A process substantially as and for the purpose set forth in claim 1, in which a solvent oil is admixed with the sludge and heated therewith and in which said heating is continued until sulfur dioxide is no longer evolved from the heated sludge.

5. A process substantially as and for the purpose set forth in claim 1, in which a solvent oil is admixed with the sludge and heated therewith and in which said heating is continued until said sludge is substantially completely dissolved.

In witness that I claim the foregoing I have hereunto subscribed my name this 5th day of April, 1927.

ERNEST W. ROTH.